(12) United States Patent
Lucas et al.

(10) Patent No.: US 9,944,771 B2
(45) Date of Patent: Apr. 17, 2018

(54) WATER-DISPERSIBLE POLYISOCYANATES

(71) Applicant: BASF SE, Ludwigshafen (DE)

(72) Inventors: Frederic Lucas, Offenburg (DE); Angelika Maria Steinbrecher, Cluj-Napoca (RO); Peter Keller, Spiesen-Elversberg (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/428,719

(22) PCT Filed: Aug. 12, 2013

(86) PCT No.: PCT/EP2013/066838
§ 371 (c)(1),
(2) Date: Mar. 17, 2015

(87) PCT Pub. No.: WO2014/048634
PCT Pub. Date: Apr. 3, 2014

(65) Prior Publication Data
US 2015/0225544 A1  Aug. 13, 2015

Related U.S. Application Data

(60) Provisional application No. 61/706,793, filed on Sep. 28, 2012.

(30) Foreign Application Priority Data

Sep. 28, 2012 (EP) .................... 12186511

(51) Int. Cl.
| C08K 5/521 | (2006.01) |
| C08G 18/70 | (2006.01) |
| C08G 18/28 | (2006.01) |
| C09D 175/04 | (2006.01) |
| C08G 18/38 | (2006.01) |
| C08K 5/17 | (2006.01) |
| C09D 133/14 | (2006.01) |

(52) U.S. Cl.
CPC ............ *C08K 5/521* (2013.01); *C08G 18/283* (2013.01); *C08G 18/3885* (2013.01); *C08G 18/706* (2013.01); *C08K 5/17* (2013.01); *C09D 133/14* (2013.01); *C09D 175/04* (2013.01)

(58) Field of Classification Search
CPC ....................................... C08K 5/521
USPC ......................................... 524/145
See application file for complete search history.

(56) References Cited

U.S. PATENT DOCUMENTS

| 417,998 | A | 12/1889 | Emmet |
| 559,805 | A | 5/1896 | Ladd |
| 3,278,457 | A | 10/1966 | Milgrom |
| 4,596,678 | A | 6/1986 | Merger et al. |
| 4,596,679 | A | 6/1986 | Hellbach et al. |
| 5,075,370 | A | 12/1991 | Kubitza et al. |
| 5,087,739 | A | 2/1992 | Bohmholdt et al. |
| 5,304,400 | A | 4/1994 | Dhein et al. |
| 5,308,912 | A | 5/1994 | Margotte et al. |
| 5,331,039 | A | 7/1994 | Blum et al. |
| 5,336,711 | A | 8/1994 | Schneider et al. |
| 5,344,873 | A | 9/1994 | Blum |
| 5,349,041 | A | 9/1994 | Blum et al. |
| 5,387,642 | A | 2/1995 | Blum et al. |
| 5,654,391 | A | 8/1997 | Gobel et al. |
| 5,741,849 | A | 4/1998 | Blum et al. |
| 5,750,613 | A | 5/1998 | Blum et al. |
| 5,783,513 | A | 7/1998 | Combs et al. |
| 6,319,981 | B1 | 11/2001 | Dhein et al. |
| 6,376,602 | B1 | 4/2002 | Probst et al. |
| 6,528,573 | B1 | 3/2003 | Probst et al. |
| 6,590,028 | B1 | 7/2003 | Probst et al. |
| 6,767,958 | B2 | 7/2004 | Laas et al. |
| 8,247,482 | B2 | 8/2012 | Bernard et al. |
| 2003/0198796 | A1 | 10/2003 | Rische et al. |
| 2010/0183883 | A1* | 7/2010 | Schaefer ............ C08G 18/0828 428/423.1 |
| 2010/0256286 | A1* | 10/2010 | Bernard ............ C08G 18/3885 524/507 |

FOREIGN PATENT DOCUMENTS

| DE | 41 13 160 A1 | 10/1992 |
| DE | 197 24 199 A1 | 12/1998 |
| DE | 100 13 186 A1 | 9/2001 |
| DE | 100 13 187 A1 | 10/2001 |
| EP | 0 126 299 A1 | 11/1984 |
| EP | 0 126 300 A1 | 11/1984 |
| EP | 0 198 343 A2 | 10/1986 |
| EP | 0 355 443 A2 | 2/1990 |
| EP | 0 358 979 A2 | 3/1990 |
| EP | 0 424 705 A2 | 5/1991 |
| EP | 0 469 389 A1 | 2/1992 |
| EP | 0 496 205 A1 | 7/1992 |
| EP | 0 496 210 A2 | 7/1992 |
| EP | 0 537 568 A2 | 4/1993 |
| EP | 0 542 085 A2 | 5/1993 |
| EP | 0 542 105 A1 | 5/1993 |
| EP | 0 543 228 A1 | 5/1993 |
| EP | 0 557 844 A1 | 9/1993 |
| EP | 0 578 940 A1 | 1/1994 |
| EP | 0 610 450 | 8/1994 |
| EP | 0 678 536 A1 | 10/1995 |
| EP | 0 751 197 A1 | 1/1997 |
| EP | 0 758 007 A2 | 2/1997 |
| EP | 1 141 065 | 10/2001 |
| EP | 1 141 066 | 10/2001 |
| RU | 2324707 | 5/2008 |
| RU | 2402557 | 10/2010 |
| WO | WO 93/09157 A1 | 5/1993 |
| WO | WO 98/56843 A1 | 12/1998 |
| WO | WO 00/37521 A1 | 6/2000 |
| WO | WO 00/37522 A1 | 6/2000 |
| WO | WO 01/88006 A1 | 11/2001 |
| WO | 2005085261 | 9/2005 |
| WO | WO 2008/116764 A1 | 10/2008 |
| WO | WO 2009/010469 A1 | 1/2009 |
| WO | WO 2009/071784 A1 | 6/2009 |
| WO | WO 2014/048776 A2 | 4/2014 |

OTHER PUBLICATIONS

U.S. Appl. No. 14/430,661, filed Mar. 24, 2015, Steinbrecher, et al.
International Search Report and Written Opinion dated May 16, 2014 in PCT/EP2013/066838.
Office Action for RU Patent Application No. 15115753. dated Jul. 4, 2017, 8 pages.

* cited by examiner

*Primary Examiner* — Doris L Lee
(74) *Attorney, Agent, or Firm* — Oblon, McClelland, Maier & Neustadt, L.L.P.

(57) ABSTRACT

The present invention relates to improved water-dispersible polyisocyanates with enhanced gloss, more particularly for two-component polyurethane coating materials.

14 Claims, No Drawings

WATER-DISPERSIBLE POLYISOCYANATES

The present invention relates to improved water-dispersible polyisocyanates for coatings with enhanced gloss, more particularly for two-component polyurethane coating materials.

Water-dispersible polyisocyanates have already been known for a long time and are frequently used as a crosslinker component together with aqueous polyol solutions in aqueous coating systems. A large number of constituents with a water-dispersing effect have become established for such polyisocyanates.

DE 4113160 A1 describes water-dispersible polyisocyanates which contain not only polyether groups but also carboxylate groups.

Polyisocyanates containing such carboxylate groups as actively dispersing groups, however, exhibit inadequate stability on storage and an insufficient dispersibility.

EP 198343 A2, for instance, describes polyisocyanates which contain carbodiimide groups and which are rendered water-dispersible by means of sulfonate groups and, if appropriate, polyether groups. Disclosed explicitly as synthesis components carrying sulfonate groups are alkoxylated sulfonates, and sulfonated diisocyanates, which have to be prepared specially.

In WO 01/88006 A1 (=U.S. Pat. No. 6,767,958) water-dispersable polyisocyanates bearing both poly ethylene oxide groups and sulfonate groups are disclosed.

WO 2009/010469 (=US 2010/0183883) discloses water-dispersible polyisocyanates bearing sulfonate groups bound to an aromatic ring and polyether groups. The polyisocyanates are easily emulsifyable and coatings obtained with such water-dispersible polyisocyanates exhibit high gloss.

WO 98/56843 and WO 09/71784 disclose water-dispersible polyisocyanates with phosphate compounds as emulgators.

However, two-component polyurethane coatings obtained with such polyisocyanate often lack a glossy appearance.

It was an object of the present invention to provide water-dispersible polyisocyanates which feature not only high ease of incorporation but also good gloss.

This object has been achieved by means of water-dispersible polyisocyanates (A), comprising as synthesis components
(a) at least one diisocyanate or polyisocyanate,
(b) at least one surfactant comprising an amine and a mixture of compounds based on the following formulae (I) and (II):

in which
R$^1$ and R$^2$ independently of one another are alkyl, cycloalkyl or aryl, it being possible for each of the stated radicals to be substituted by aryl, alkyl, aryloxy, alkyloxy, heteroatoms and/or heterocycles,
said mixture of compounds of formulae (I) and (II) being characterised in that the molar ratio between compound (II), i.e. the monoester-type compound, and compound (I), i.e. the diester-type compound, is from 5:95 to 95:5,
(c) at least one monofunctional polyalkylene glycol,
(d) optionally at least one high molecular mass diol or polyol, and
(e) optionally at least one low molecular mass diol or polyol.

Such polyisocyanates (A) of the invention feature not only high ease of incorporation into aqueous polyol solutions but also good drying properties. Moreover, they give coatings featuring good hardness, and high gloss.

Synthesis component (a) is at least one, one to three for example, one to two for preference, and more preferably precisely one diisocyanate or polyisocyanate.

The monomeric isocyanates used may be aromatic, aliphatic or cycloaliphatic, preferably aliphatic or cycloaliphatic, which is referred to for short in this text as (cyclo) aliphatic. Aliphatic isocyanates are particularly preferred.

Aromatic isocyanates are those which comprise at least one aromatic ring system, in other words not only purely aromatic compounds but also araliphatic compounds.

Cycloaliphatic isocyanates are those which comprise at least one cycloaliphatic ring system.

Aliphatic isocyanates are those which comprise exclusively linear or branched chains, i.e., acyclic compounds.

The monomeric isocyanates are preferably diisocyanates, which carry precisely two isocyanate groups. They can, however, in principle also be monoisocyanates having an isocyanate group.

In principle, higher isocyanates having on average more than 2 isocyanate groups are also possible. Suitability is possessed for example by triisocyanates, such as triisocyanatononane, 2,6-diisocyanato-1-hexanoic acid 2'-isocyanatoethyl ester, 2,4,6-triisocyanatotoluene, triphenylmethane triisocyanate or 2,4,4'-triisocyanatodiphenyl ether, or the mixtures of diisocyanates, triisocyanates, and higher polyisocyanates that are obtained, for example, by phosgenation of corresponding aniline/formaldehyde condensates and represent methylene-bridged polyphenyl polyisocyanates and the corresponding ring-hydrogenated isocyanates.

These monomeric isocyanates do not contain any substantial products of reaction of the isocyanate groups with themselves.

The monomeric isocyanates are preferably isocyanates having 4 to 20 carbon atoms. Examples of typical diisocyanates are aliphatic diisocyanates such as tetramethylene diisocyanate, pentamethylene 1,5-diisocyanate, hexamethylene diisocyanate (1,6-diisocyanatohexane), octa-methylene diisocyanate, decamethylene diisocyanate, dodecamethylene diisocyanate, tetradecamethylene diisocyanate, derivatives of lysine diisocyanate (e.g. lysine methyl ester diisocyanate, lysine ethyl ester diisocyanate), trimethylhexane diisocyanate or tetramethylhexane diisocyanate, cycloaliphatic diisocyanates such as 1,4-, 1,3- or 1,2-diisocyanatocyclo-hexane, 4,4'- or 2,4'-di(isocyanatocyclohexyl) methane, 1-isocyanato-3,3,5-trimethyl-5-(isocyanatomethyl)cyclohexane (isophorone diisocyanate), 1,3- or 1,4-bis(isocyanatomethyl)cyclohexane or 2,4-, or 2,6-diisocyanato-1-methylcyclohexane, and also 3 (or 4), 8 (or 9)-bis(isocyanatomethyl)tricyclo[5.2.1.0$^{2,6}$]decane isomer mixtures, and also aromatic diisocyanates such as tolylene 2,4- or 2,6-diisocyanate and the isomer mixtures thereof, m- or p-xylylene diisocyanate, 2,4'- or 4,4'-diisocyanatodiphenylmethane and the isomer mixtures thereof, phenylene 1,3- or 1,4-diisocyanate, 1-chlorophenylene 2,4-diisocyanate, naphthylene 1,5-diisocyanate, diphenylene 4,4'-diisocyanate, 4,4'-diisocyanato-3,3'-dimethylbiphenyl, 3-methyldiphenylmethane 4,4'-diisocyanate, tetramethylxylylene diisocyanate, 1,4-diisocyanatobenzene or diphenyl ether 4,4'-diisocyanate.

Particular preference is given to hexamethylene 1,6-diisocyanate, 1,3-bis(isocyanatomethyl)cyclohexane, isophorone diisocyanate, and 4,4'- or 2,4'-di(isocyanatocyclohexyl)methane, very particular preference to isophorone diisocyanate and hexamethylene 1,6-diisocyanate, and especial preference to hexamethylene 1,6-diisocyanate.

Mixtures of said isocyanates may also be present.

Isophorone diisocyanate is usually in the form of a mixture, specifically a mixture of the cis and trans isomers, generally in a proportion of about 60:40 to 80:20 (w/w), preferably in a proportion of about 70:30 to 75:25, and more preferably in a proportion of approximately 75:25.

Dicyclohexylmethane 4,4'-diisocyanate may likewise be in the form of a mixture of the different cis and trans isomers.

For the present invention it is possible to use not only those diisocyanates obtained by phosgenating the corresponding amines but also those prepared without the use of phosgene, i.e., by phosgene-free processes. According to EP-A-0 126 299 (U.S. Pat. No. 4,596,678), EP-A-126 300 (U.S. Pat. No. 4,596,679), and EP-A-355 443 (U.S. Pat. No. 5,087,739), for example, (cyclo)aliphatic diisocyanates, such as hexamethylene 1,6-diisocyanate (HDI), isomeric aliphatic diisocyanates having 6 carbon atoms in the alkylene radical, 4,4'- or 2,4'-di(isocyanatocyclohexyl)methane, and 1-isocyanato-3-isocyanatomethyl-3,5,5-trimethylcyclohexane (isophorone diisocyanate or IPDI), for example, can be prepared by reacting the (cyclo)aliphatic diamines with, for example, urea and alcohols to give (cyclo)aliphatic biscarbamic esters and subjecting said esters to thermal cleavage into the corresponding diisocyanates and alcohols. The synthesis takes place usually continuously in a circulation process and in the presence, if appropriate, of N-unsubstituted carbamic esters, dialkyl carbonates, and other by-products recycled from the reaction process. Diisocyanates obtained in this way generally contain a very low or even unmeasurable fraction of chlorinated compounds, which is advantageous, for example, in applications in the electronics industry.

In one embodiment of the present invention the isocyanates used have a total hydrolyzable chlorine content of less than 200 ppm, preferably of less than 120 ppm, more preferably less than 80 ppm, very preferably less than 50 ppm, in particular less than 15 ppm, and especially less than 10 ppm. This can be measured by means, for example, of ASTM specification D4663-98. Of course, though, monomeric isocyanates having a higher chlorine content can also be used, of up to 500 ppm, for example.

It will be appreciated that it is also possible to employ mixtures of those monomeric isocyanates which have been obtained by reacting the (cyclo)aliphatic diamines with, for example, urea and alcohols and cleaving the resulting (cyclo)aliphatic biscarbaminic esters, with those diisocyanates which have been obtained by phosgenating the corresponding amines.

The polyisocyanates (a) to which the monomeric isocyanates can be oligomerized are generally characterized as follows:

The average NCO functionality of such compounds is in general at least 1.8 and can be up to 8, preferably 2 to 5, and more preferably 2.4 to 4.

The isocyanate group content after oligomerization, calculated as NCO=42 g/mol, is generally from 5% to 25% by weight unless otherwise specified.

The polyisocyanates (a) are preferably compounds as follows:
1) Polyisocyanates containing isocyanurate groups and derived from aromatic, aliphatic and/or cycloaliphatic diisocyanates. Particular preference is given in this context to the corresponding aliphatic and/or cycloaliphatic isocyanatoisocyanurates and in particular to those based on hexamethylene diisocyanate and isophorone diisocyanate. The isocyanurates present are, in particular, trisisocyanatoalkyl and/or trisisocyanatocycloalkyl isocyanurates, which constitute cyclic trimers of the diisocyanates, or are mixtures with their higher homologs containing more than one isocyanurate ring. The isocyanatoisocyanurates generally have an NCO content of 10% to 30% by weight, in particular 15% to 25% by weight, and an average NCO functionality of 2.6 to 8.
2) Polyisocyanates containing uretdione groups and having aromatically, aliphatically and/or cycloaliphatically attached isocyanate groups, preferably aliphatically and/or cycloaliphatically attached, and in particular those derived from hexamethylene diisocyanate or isophorone diisocyanate. Uretdione diisocyanates are cyclic dimerization products of diisocyanates.
The polyisocyanates containing uretdione groups are obtained in the context of this invention as a mixture with other polyisocyanates, more particularly those specified under 1). For this purpose the diisocyanates can be reacted under reaction conditions under which not only uretdione groups but also the other polyisocyanates are formed, or the uretdione groups are formed first of all and are subsequently reacted to give the other polyisocyanates, or the diisocyanates are first reacted to give the other polyisocyanates, which are subsequently reacted to give products containing uretdione groups.
3) Polyisocyanates containing biuret groups and having aromatically, cycloaliphatically or aliphatically attached, preferably cycloaliphatically or aliphatically attached, isocyanate groups, especially tris(6-isocyanatohexyl)biuret or its mixtures with its higher homologs. These polyisocyanates containing biuret groups generally have an NCO content of 18% to 22% by weight and an average NCO functionality of 2.8 to 6.
4) Polyisocyanates containing urethane and/or allophanate groups and having aromatically, aliphatically or cycloaliphatically attached, preferably aliphatically or cycloaliphatically attached, isocyanate groups, such as may be obtained, for example, by reacting excess amounts of diisocyanate, such as of hexamethylene diisocyanate or of isophorone diisocyanate, with mono- or polyhydric alcohols (a). These polyisocyanates containing urethane and/or allophanate groups generally have an NCO content of 12% to 24% by weight and an average NCO functionality of 2.1 to 4.5. Polyisocyanates of this kind containing urethane and/or allophanate groups may be prepared without catalyst or, preferably, in the presence of catalysts, such as ammonium carboxylates or ammonium hydroxides, for example, or allophanatization catalysts, such as Zn(II) compounds, for example, in each case in the presence of monohydric, dihydric or polyhydric, preferably monohydric, alcohols. The polyisocyanates containing urethane and/or allophanate groups can also be prepared in a mixture with other polyisocyanates, more particularly those specified under 1).
5) Polyisocyanates comprising oxadiazinetrione groups, derived preferably from hexamethylene diisocyanate or isophorone diisocyanate. Polyisocyanates of this kind comprising oxadiazinetrione groups are accessible from diisocyanate and carbon dioxide.
6) Polyisocyanates comprising iminooxadiazinedione groups, derived preferably from hexamethylene diisocyanate or isophorone diisocyanate. Polyisocyanates of this kind comprising iminooxadiazinedione groups are preparable from diisocyanates by means of specific catalysts.
7) Uretonimine-modified polyisocyanates.
8) Carbodiimide-modified polyisocyanates.
9) Hyperbranched polyisocyanates, of the kind known for example from DE-A1 10013186 or DE-A1 10013187.
10) Polyurethane-polyisocyanate prepolymers, from di- and/or polyisocyanates with alcohols.
11) Polyurea-polyisocyanate prepolymers.
12) The polyisocyanates 1)-11), preferably 1), 3), 4) and 6), can be converted, following their preparation, into polyisocyanates containing biuret groups or urethane/allophanate groups and having aromatically, cycloaliphatically or aliphatically attached, preferably (cyclo)aliphatically attached, isocyanate groups. The formation of biuret groups, for example, is accomplished by addition of water, water donor compounds (e.g., tert-butanol), or by reaction with amines. The formation of urethane and/or allophanate groups is accomplished by reaction with monohydric, dihydric or polyhydric, preferably monohydric, alcohols, in the presence if appropriate of suitable catalysts. These polyisocyanates containing biuret or urethane/allophanate groups generally have an NCO content of 18% to 22% by weight and an average NCO functionality of 2.8 to 6.
13) Hydrophilically modified polyisocyanates, i.e., polyisocyanates which as well as the groups described under 1-12 also comprise groups which result formally from addition of molecules containing NCO-reactive groups and hydrophilizing groups to the isocyanate groups of above molecules. The latter groups are nonionic groups such as alkylpoly-ethylene oxide and/or ionic groups derived from phosphoric acid, phosphonic acid, sulfuric acid or sulfonic acid, and/or their salts.
14) Modified polyisocyanates for dual care applications, i.e., polyisocyanates which as well as the groups described under 1-12 also comprise groups resulting formally from addition of molecules containing NCO-reactive groups and UV-crosslinkable or actinic-radiation-crosslinkable groups to the isocyanate groups of above molecules. These molecules are, for example, hydroxyalkyl (meth) acrylates and other hydroxyl-vinyl compounds.

The diisocyanates or polyisocyanates recited above may also be present at least partly in blocked form.

Classes of compounds used for blocking are described in D. A. Wicks, Z. W. Wicks, Progress in Organic Coatings, 36, 148-172 (1999), 41, 1-83 (2001) and also 43, 131-140 (2001).

Examples of classes of compounds used for blocking are phenols, imidazoles, triazoles, pyrazoles, oximes, N-hydroxyimides, hydroxyl benzoic esters, secondary amines, lactams, CH-acidic cyclic ketones, malonic esters or alkyl acetoacetates.

In one preferred embodiment of the present invention the polyisocyanate (a) is selected from the group consisting of isocyanurates, biurets, urethanes and allophanates, preferably from the group consisting of isocyanurates, urethanes and allophanates, more preferably from the group consisting of isocyanurates and allophanates; in particular it is a polyisocyanate containing isocyanurate groups.

In one particularly preferred embodiment the polyisocyanate (a) encompasses polyisocyanates comprising isocyanurate groups and obtained from hexamethylene 1,6-diisocyanate.

In one further particularly preferred embodiment the polyisocyanate (a) encompasses a mixture of polyisocyanates comprising isocyanurate groups and obtained from hexamethylene 1,6-diisocyanate and from isophorone diisocyanate.

In one particularly preferred embodiment the polyisocyanate (a) encompasses a mixture comprising low-viscosity polyisocyanates, preferably polyisocyanates comprising isocyanurate groups, having a viscosity of 600-1500 mPa*s, more particularly below 1200 mPa*s, low-viscosity urethanes and/or allophanates having a viscosity of 200-1600 mPa*s, more particularly 600-1500 mPa*s, and/or polyisocyanates comprising iminooxadiazinedione groups.

In this specification the viscosity at 23° C. in accordance with DIN EN ISO 3219/A.3 is specified, in a cone/plate system at a shear rate of 250 s$^{-1}$, unless noted otherwise.

Synthesis Component (b)

The composition according to the invention particularly advantageously contains a mixture of compounds based on the following formulae (I) and (II):

$$\underset{-O}{\overset{O}{\underset{\|}{P}}}\overset{O-R^1}{\underset{O-R^2}{}} \quad (I)$$

$$\underset{-O}{\overset{O}{\underset{\|}{P}}}\overset{O-H}{\underset{O-R^2}{}} \quad (II)$$

$R^1$ and $R^2$ being as defined above for formulae (I) and (II).

$R^1$ and $R^2$ independently of one another are alkyl, cycloalkyl or aryl, it being possible for each of the stated radicals to be substituted by aryl, alkyl, aryloxy, alkyloxy, heteroatoms and/or heterocycles.

Definitions therein are as follows:

$C_1$-$C_{18}$ alkyl substituted if appropriate by aryl, alkyl, aryloxy, alkyloxy, heteroatoms and/or heterocycles is for example methyl, ethyl, propyl, isopropyl, n-butyl, sec-butyl, tert-butyl, pentyl, hexyl, heptyl, octyl, 2-ethylhexyl, 2,4,4-trimethylpentyl, decyl, dodecyl, tetradecyl, hexadecyl, octadecyl, 1,1-dimethylpropyl, 1,1-dimethylbutyl, 1,1,3,3-tetramethylbutyl, benzyl, 1-phenylethyl, 2-phenylethyl, α,α-dimethylbenzyl, benzhydryl, p-tolylmethyl, 1-(p-butylphenyl)ethyl, p-chlorobenzyl, 2,4-dichlorobenzyl, p-methoxybenzyl, m-ethoxybenzyl, 2-cyanoethyl, 2-cyanopropyl, 2-methoxycarbonethyl, 2-ethoxycarbonylethyl, 2-butoxycarbonylpropyl, 1,2-di(methoxycarbonyl)ethyl, 2-methoxyethyl, 2-ethoxyethyl, 2-butoxyethyl, diethoxymethyl, diethoxyethyl, 1,3-dioxolan-2-yl, 1,3-dioxan-2-yl, 2-methyl-1,3-dioxolan-2-yl, 4-methyl-1,3-dioxolan-2-yl, 2-isopropoxyethyl, 2-butoxypropyl, 2-octyloxyethyl, chloromethyl, 2-chloroethyl, trichloromethyl, trifluoromethyl, 1,1-dimethyl-2-chloroethyl, 2-methoxyisopropyl, 2-ethoxyethyl, butylthiomethyl, 2-dode-cylthioethyl, 2-phenylthioethyl, 2,2,2-trifluoroethyl, 2-phenoxyethyl, 2-phenoxypropyl, 3-phenoxypropyl, 4-phenoxybutyl, 6-phenoxyhexyl, 2-methoxyethyl, 2-methoxypropyl, 3-methoxypropyl, 4-methoxybutyl, 6-methoxyhexyl, 2-ethoxyethyl, 2-ethoxypropyl, 3-ethoxypropyl, 4-ethoxybutyl or 6-ethoxyhexyl, $C_6$-$C_{12}$ aryl substituted if appropriate by aryl, alkyl, aryloxy, alkyloxy, heteroatoms and/or heterocycles is for example phenyl, tolyl, xylyl, α-naphthyl, β-naphthyl, 4-biphenylyl, chlorophenyl, dichlorophenyl, trichlorophenyl, difluorophenyl, methylphenyl, dimethylphenyl, trimethylphenyl, ethylphenyl, diethylphenyl, iso-propylphenyl, tert-butylphenyl, dodecylphenyl, methoxyphenyl, dimethoxyphenyl, ethoxyphenyl, hexyloxyphenyl, methyl naphthyl, isopropylnaphthyl, chloronaphthyl, ethoxynaphthyl, 2,6-dimethylphenyl, 2,4,6-trimethylphenyl, 2,6-dimethoxyphenyl, 2,6-dichlorophenyl, 4-bromophenyl, 2- or 4-nitrophenyl, 2,4- or 2,6-dinitrophenyl, 4-di methylaminophenyl, 4-acetylphenyl, methoxyethylphenyl or ethoxymethylphenyl, and $C_5$-$C_{12}$ cycloalkyl substituted if appropriate by aryl, alkyl, aryloxy, alkyloxy, heteroatoms and/or heterocycles is for example cyclopentyl, cyclohexyl, cyclooctyl, cyclododecyl, methylcyclopentyl, dimethylcyclopentyl, methylcyclohexyl, dimethylcyclohexyl, diethylcyclohexyl, butylcyclohexyl, methoxycyclohexyl, dimethoxycyclohexyl, diethoxycyclohexyl, butylthiocyclohexyl, chlorocyclohexyl, dichlorocyclohexyl, dichlorocyclopentyl, and a saturated or unsaturated bicyclic system such as norbornyl or norbornenyl, for example.

Preferably $R^1$ and $R^2$ independently of one another can be unsubstituted alkyl or unsubstituted aryl, more preferably methyl, ethyl, isopropyl, tert-butyl, hexyl, octyl, nonyl, decyl, dodecyl, phenyl or naphthyl, very preferably phenyl, methyl, ethyl, n-butyl, and 2-ethylhexyl, and more particularly ethyl, n-butyl, and 2-ethylhexyl.

The compounds (b) are preferably mono methyl phosphate, di methyl phosphate, mono ethyl phosphate, di ethyl phosphate, mono n-butyl phosphate, di n-butyl phosphate, mono 2-ethylhexyl phosphate, di 2-ethylhexyl phosphate, and mixtures thereof.

The mixture of compounds of formulae (I) and (II) is characterised in that the molar ratio between compound (II), i.e. the monoester-type compound, and compound (I), i.e. the diester-type compound, is from 5:95 to 95:5, preferably from 20:80 to 80:20, particularly preferably from 30:70 to 70:30 and especially preferably from 33:67 to 67:33.

Component (c) encompasses monofunctional polyalkylene oxide polyether alcohols, which are reaction products of suitable starter molecules with polyalkylene oxides.

Suitable starter molecules for preparing monohydric polyalkylene oxide polyether alcohols are thiol compounds, monohydroxy compounds of the general formula

$$R^4\text{—O—H}$$

or secondary monoamines of the general formula

$$R^5R^6N\text{—H},$$

in which
$R^4$, $R^5$ and $R^6$ each independently of one another are $C_1$-$C_{20}$ alkyl, $C_2$-$C_{20}$ alkyl uninterrupted or interrupted by one or more oxygen and/or sulfur atoms and/or by one or more substituted or unsubstituted imino groups, or $C_6$-$C_{12}$ aryl, $C_5$-$C_{12}$ cycloalkyl or a five- to six-membered heterocycle containing oxygen, nitrogen and/or sulfur atoms, or $R^5$ and $R^6$ together form an unsaturated, saturated or aromatic ring which is uninterrupted or interrupted by one or more oxygen and/or sulfur atoms and/or by one or more substituted or unsubstituted imino groups, it being possible for the stated radicals to be substituted in each case by functional groups, aryl, alkyl, aryloxy, alkyloxy, halogen, heteroatoms and/or heterocycles.

Preferably $R^4$, $R^5$, and $R^6$ independently of one another are $C_1$- to $C_4$ alkyl, i.e., methyl, ethyl, isopropyl, n-propyl, n-butyl, isobutyl, sec-butyl or tert-butyl; more preferably $R^4$, $R^5$, and $R^6$ are methyl.

Examples of suitable monovalent starter molecules are saturated monoalcohols such as methanol, ethanol, n-propanol, isopropanol, n-butanol, isobutanol, sec-butanol, the isomeric pentanols, hexanols, octanols, and nonanols, n-decanol, n-dodecanol, n-tetradecanol, n-hexadecanol, n-octadecanol, cyclohexanol, cyclopentanol, the isomeric methylcyclohexanols or hydroxymethylcyclohexane, 3-ethyl-3-hydroxy-methyloxetane, or tetrahydrofurfuryl alcohol; unsaturated alcohols such as allyl alcohol, 1,1-dimethylallylalcohol or oeyl alcohol, aromatic alcohols such as phenol, the isomeric cresols or methoxyphenols, araliphatic alcohols such as benzyl alcohol, anisyl alcohol or cinnamyl alcohol; secondary monoamines such as dimethylamine, diethylamine, dipropylamine, diisopropylamine, di-n-butylamine, diisobutylamine, bis(2-ethylhexyl)amine, N-methyl- and N-ethylcyclohexylamine or dicyclohexylamine, heterocyclic secondary amines such as morpholine, pyrrolidine, piperidine or 1H-pyrazole, and also amino alcohols such as 2-dimethylaminoethanol, 2-diethylaminoethanol, 2-diisopropylaminoethanol, 2-dibutylaminoethanol, 3-(dimethylamino)-1-propanol or 1-(dimethylamino)-2-propanol.

Examples of polyethers prepared starting from amines are the Jeffamine® M series, which represent methyl-capped polyalkylene oxides with an amino function, such as M-600 (XTJ-505), having a propylene oxide (PO)/ethylene oxide (EO) ratio of approximately 9:1 and a molar mass of approximately 600, M-1000 (XTJ-506):PO/EO ratio 3:19, molar mass approximately 1000, M-2005 (XTJ-507):PO/EO ratio 29:6, molar mass approximately 2000, or M-2070:PO/EO ratio 10:31, molar mass approximately 2000.

Alkylene oxides suitable for the alkoxylation reaction are ethylene oxide, propylene oxide, isobutylene oxide, vinyloxirane and/or styrene oxide, which may be used in any order or else in a mixture in the alkoxylation reaction.

Preferred alkylene oxides are ethylene oxide, propylene oxide, and their mixtures; ethylene oxide is particularly preferred.

Preferred polyether alcohols are those which are based on polyalkylene oxide polyether alcohols in whose preparation saturated aliphatic or cycloaliphatic alcohols of the abovementioned kind were used as starter molecules. Very particular preference is given to those based on polyalkylene oxide polyether alcohols prepared using saturated aliphatic alcohols having 1 to 4 carbon atoms in the alkyl radical. Particular preference is given to polyalkylene oxide polyether alcohols prepared starting from methanol.

The monohydric polyalkylene oxide polyether alcohols have on average in general at least two alkylene oxide units, preferably at least 5 alkylene oxide units, per molecule, more preferably at least 7, and very preferably at least 10 alkylene oxide units, more particularly ethylene oxides unit.

The monohydric polyalkylene oxide polyether alcohols have on average in general up to 50 alkylene oxide units per molecule, preferably up to 45, more preferably up to 40, and very preferably up to 30 alkylene oxide units, more particularly ethylene oxide units.

The molar weight of the monohydric polyalkylene oxide polyether alcohols is preferably up to 4000, more preferably not above 2000 g/mol, very preferably not below 250 and more particularly 500±100 g/mol.

Preferred polyether alcohols are therefore compounds of the formula $$R^4-O-[-X_i-]_k-H$$

in which
$R^4$ is as defined above,
k is an integer from 5 to 40, preferably 7 to 20, and more preferably 10 to 15, and each $X_i$ for i=1 to k can be selected independently from the group consisting of —$CH_2$—$CH_2$—O—, —$CH_2$—$CH(CH_3)$—O—, —$CH(CH_3)$—$CH_2$—O—, —$CH_2$—$C(CH_3)_2$—O—, —$C(CH_3)_2$—$CH_2$—O—, —$CH_2$—CHVin-O—, —CHVin-O—$CH_2$—O—, —$CH_2$—CHPh-O—, and —CHPh-$CH_2$—O—, preferably from the group consisting of —$CH_2$—$CH_2$—O—, —$CH_2$—CH($CH_3$)—O— and —CH($CH_3$)—$CH_2$—O—, and more preferably —$CH_2$—$CH_2$—O—
in which Ph is phenyl and Vin is vinyl.

The polyalkylene oxide polyether alcohols are generally prepared by alkoxylating the starter compounds in the presence of a catalyst, such as of an alkali metal or alkaline earth metal hydroxide, oxide, carbonate or hydrogencarbonate, for example.

The polyalkylene oxide polyether alcohols can also be prepared with the aid of multimetal cyanide compounds, frequently also referred to as DMC catalysts, which have been known for a long time and have been widely described in the literature, as for example in U.S. Pat. No. 3,278,457 and in U.S. Pat. No. 5,783,513.

The DMC catalysts are typically prepared by reacting a metal salt with a cyanometalate compound. To enhance the properties of the DMC catalysts it is customary to add organic ligands during and/or after the reaction. A description of the preparation of DMC catalysts is found, for example, in U.S. Pat. No. 3,278,457.

Typical DMC catalysts have the following general formula:

$$M^1_a[M^2(CN)_b]_d \cdot f M^1_j X_k \cdot h(H_2O) e L \cdot z P$$

in which
$M^1$ is a metal ion selected from the group comprising $Zn^{2+}$, $Fe^{2+}$, $Fe^{3+}$, $Co^{2+}$, $Co^{3+}$, $Ni^{2+}$, $Mn^{2+}$, $Sn^{2+}$, $Sn^{4+}$, $Pb^{2+}$, $Al^{3+}$, $Sr^{2+}$, $Cr^{3+}$, $Cd^{2+}$, $Cu^{2+}$, $La^{3+}$, $Ce^{3+}$, $Ce^{4+}$, $Eu^{3+}$, $Mg^{2+}$, $Ti^{4+}$, $Ag^+$, $Rh^{2+}$, $Ru^{2+}$, $Ru^{3+}$, $Pd^{2+}$,
$M^2$ is a metal ion selected from the group comprising $Fe^{2+}$, $Fe^{3+}$, $Co^{2+}$, $Co^{3+}$, $Mn^{2+}$, $Mn^{3+}$, $Ni^{2+}$, $Cr^{2+}$, $Cr^{3+}$, $Rh^{3+}$, $Ru^{2+}$, $Ir^{3+}$,
$M^1$ and $M^2$ are alike or different,
X is an anion selected from the group comprising halide, hydroxide, sulfate, hydrogen sulfate, carbonate, hydrogen carbonate, cyanide, thiocyanate, isocyanate, cyanate, carboxylate, oxalate, nitrate or nitrite ($NO_2^-$) or a mixture of two or more of the aforementioned anions, or a mixture of one or more of the aforementioned anions with one of the uncharged species selected from CO, $H_2O$, and NO,
Y is an anion which is different than X and is selected from the group comprising halide, sulfate, hydrogen sulfate, disulfate, sulfite, sulfonate (=$RSO_3^-$ with R=C1-C20 alkyl, aryl, C1-C20 alkylaryl), carbonate, hydrogen carbonate, cyanide, thiocyanate, isocyanate, isothiocyanate, cyanate, carboxylate, oxalate, nitrate, nitrite, phosphate, hydrogen phosphate, dihydrogen phosphate, diphosphate, borate, tetraborate, perchlorate, tetrafluoroborate, hexafluorophosphate, and tetraphenylborate,
L is a water-miscible ligand selected from the group comprising alcohols, aldehydes, ketones, ethers, polyethers, esters, polyesters, polycarbonate, ureas, amides, nitriles, and sulfides or mixtures thereof,
P is an organic additive selected from the group comprising polyethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylamide-co-maleic acid), polyacrylonitrile, polyalkyl acrylates, polyalkyl methacrylates, polyvinyl methyl ether, polyvinyl ethyl ether, polyvinyl acetate, polyvinyl alcohol, poly-N-vinylpyrrolidone, poly (N-vinylpyrrolidone-co-acrylic acid), polyvinyl methyl ketone, poly(4-vinylphenol), poly(acrylic acid-co-styrene), oxazoline polymers, polyalkyleneimines, maleic acid and maleic anhydride copolymer, hydroxylethylcellulose, polyacetates, ionic surface- and interface-active compounds, bile acid or salts, esters or amides thereof, carboxylic esters of polyhydric alcohols, and glycosides,
and
a, b, d, g, n, r, s, j, k, and t are integral or fractional numbers greater than zero, e, f, h and z are integral or fractional numbers greater than or equal to zero,
with
a, b, d, g, n, j, k, and r, and also s and t, being selected so as to ensure electroneutrality,
$M^3$ being hydrogen or an alkali metal or alkaline earth metal, and
$M^4$ being alkali metal ions or an ammonium ion ($NH_4^+$) or an alkylammonium ion ($R_4N^+$, $R_3NH^+$, $R_2NH_2^+$, $RNH_3^+$ with R=C1-C20 alkyl).

In one particularly preferred embodiment of the invention $M^1$ is $Zn^{2+}$ and $M^2$ is $Co^{3+}$ or $Co^{2+}$.

The metals $M^1$ and $M^2$ are alike particularly when they are cobalt, manganese or iron.

The residues of the catalyst may remain in the product obtained or may be neutralized using an acid, preferably hydrochloric acid, sulfuric acid or acetic acid, with the salts being subsequently removable preferably by means, for example, of washing or of ion exchangers. If appropriate, a partial neutralization may take place, and the product may be used further without further removal of the salts.

The optional synthesis component (d) encompasses high molecular mass diols or polyols, by which is meant a number-average molecular weight of at least 400, preferably 400 to 6000.

The compounds in question are more particularly dihydric or polyhydric polyester polyols and polyether polyols, the dihydric polyols being preferred.

Suitable polyester polyols include, in particular, the conventional reaction products of polyhydric alcohols with polybasic carboxylic acids, with the alcoholic component being employed in excess. The polybasic carboxylic acids may be aliphatic, cycloaliphatic, aromatic, heterocyclic or ethylenically unsaturated in nature and may also, if appropriate, carry halogen atom substituents. Instead of the polybasic carboxylic acids it is also possible for their anhydrides to be esterified. Examples of suitable polybasic starting carboxylic acids include the following: succinic acid, adipic acid, sebacic acid, phthalic acid, isophthalic acid, trimellitic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride or fumaric acid.

Polyhydric alcohols for use in excess include the following: ethane-1,2-diol, propane-1,2-diol, propane-1,3-diol, butane-1,2-diol, butane-1,3-diol, butane-1,4-diol, butene-1, 4-diol, butyne-1,4-diol, pentane-1,5-diol and its positional isomers, hexane-1,6-diol, octane-1,8-diol, 1,4-bishydroxymethylcyclohexane, 2,2-bis4-hydroxycyclohexyl)propane, 2-methyl-1,3-propanediol, glycerol, trimethylpropane, trimethylolethane, hexane-1,2,6-triol, butane-1,2,4-triol, diethylene glycol, triethylene glycol, tetraethylene glycol, polyethylene glycol having a molar mass of 378 to 900, preferably of 378 to 678, poly-1,2-propylene glycol or poly-1,3-propanediol with a molar mass of 134 to 1178, preferably 134 to 888, polyTHF having a molar mass of 162 to 2000, preferably between 378 and 1458, with particular preference 378 to 678.

Preference is given to polyester polyols formed from diols and dicarboxylic acids.

Further suitable polyester polyols are the adducts of lactones or lactone mixtures with dihydric alcohols used as starter molecules. Examples of preferred lactones are ε-caprolactone, β-propiolactone, γ-butyrolactone or methyl-ε-caprolactone.

Suitable starter molecules are more particularly the low molecular mass dihydric alcohols already specified as synthesis components for the polyester polyols.

Also suitable, of course, are polyesters formed from hydroxycarboxylic acids as synthesis components. Synthesis components (d) suitable as polyesters are, furthermore, also polycarbonates, of the kind obtainable, for example, from phosgene or diphenyl carbonate and, in excess, the low molecular mass dihydric alcohols specified as synthesis components for the polyester polyols.

Suitable synthesis components (d) with polyether polyol suitability include, preferably, polyether diols, of the kind obtainable, for example, by boron trifluoride-catalyzed linking of ethylene oxide, propylene oxide, butylene oxide, tetrahydrofuran, styrene oxide or epichlorohydrin to itself or to one another, or by addition reaction of these compounds, individually or in a mixture, with starter components containing reactive hydrogen atoms, such as water, polyfunctional alcohols or amines such as ethane-1,2-diol, propane-1,3-diol, 1,2- or 2,2-bis(4-hydroxyphenyl)propane, or aniline. Furthermore, polyether-1,3-diols, examples being trimethylolpropane which is alkoxylated on one OH group and whose alkylene oxide chain is capped with an alkyl radical comprising 1 to 18 C atoms, are synthesis components (d) employed with preference.

Optional synthesis components (e) may be low molecular mass dihydric or polyhydric alcohols, among which the dihydric alcohols are preferred. Low molecular mass here denotes a number-average molecular weight from 62 to 399.

Suitable synthesis components (e) include ethane-1,2-diol, propane-1,2-diol, propane-1,3-diol, butane-1,2-diol, butane-1,3-diol, butane-1,4-diol, butene-1,4-diol, butyne-1,4-diol, pentane-1,5-diol and its positional isomers, hexane-1,6-diol, octane-1,8-diol, 1,4-bishydroxymethylcyclohexane, 2,2-bis(4-hydroxycyclohexyl)propane, 2-methyl-1,3-propanediol, hexane-1,2,6-triol, butane-1,2,4-triol, diethylene glycol, triethylene glycol, tetraethylene glycol, low molecular mass polyethylene glycol, poly-1,2-propylene glycol, poly-1,3-propanediol or polyTHF, neopentyl glycol, neopentyl glycol hydroxypivalate, 2-ethyl-1,3-propanediol, 2-methyl-1,3-propanediol, 2-ethyl-1,3-hexanediol, hydroquinone, bisphenol A, bisphenol F, bisphenol B, bisphenol S, 2,2-bis(4-hydroxycyclohexyl)propane, 1,1-, 1,2-, 1,3-, and 1,4-cyclohexanedimethanol, 1,2-, 1,3- or 1,4-cyclohexanediol and also polyhydric alcohols such as trimethylolbutane, trimethylolpropane, pentaerythritol, trimethylolethane, glycerol, ditrimethylolpropane, dipentaerythritol or sugar alcohols such as sorbitol, mannitol, diglycerol, threitol, erythritol, adonitol (ribitol), arabitol (lyxitol), xylitol, dulcitol (galactitol), maltitol or isomalt. Preference is given to using linear 1,ω-dihydroxyalkanes, more preferably butane-1,4-diol and hexane-1,6-diol.

The polyisocyanates (A) generally have the following construction, based on isocyanate groups (calculated as NCO with a molecular weight of 42 g/mol) in synthesis component (a):

(b) 0.5 to 30 wt % of compounds of formula (I) and/or (II), preferably 0.8 to 25 wt % and more preferably 1.0 to 20 wt %, (c) at least 0.3 wt %, preferably at least 0.5, more preferably at least 1.0, and very preferably at least 1.2 wt %, and also up to 25 wt %, preferably up to 20, more preferably up to 15, and very preferably up to 10 wt %, based on isocyanate-reactive groups in (c), (d) 0 to 15 wt %, preferably 0 to 10 wt %, more preferably 0 to 5 wt %, and very preferably 0 wt %, based on isocyanate-reactive groups in (d), and (e) 0 to 15 wt %, preferably 0 to 10 wt %, more preferably 0 to 5 wt %, and very preferably 0 wt %, based on isocyanate-reactive groups in (e).

The NCO content of the polyisocyanates (A) of the invention is generally 13% by weight or more, preferably 14% by weight or more, more preferably 15% by weight or more, and very preferably 16% by weight or more, in conjunction with very good water-dispersibility. Normally 22% by weight is not exceeded.

Whether compound (b) is incorporated into the polyisocyanate or not is not relevant for the present invention. Without wishing to be bound to a theory it is assumed that at least a part of compound (b) of formula (II) is incorporated into polyisocyanate (A) by reaction of at least one free anionic oxygen group or hydroxy group. It is further assumed that the compounds of formula (II) remain in the water phase. For the sake of simplicity the compound (b) is referred to as "incorporated" into polyisocyanate (A) throughout the description, regardless of their actual state of binding.

Preferred polyisocyanates (A) have a fraction of the structural units —[—$CH_2$—$CH_2$—O—]—, calculated as 44 g/mol, in relation to the sum of components a)+b)+c)+d)+e), of at least 5%, preferably at least 10%, and more preferably at least 12%, by weight. In general the fraction is not more than 25%, preferably not more than 22%, and more preferably not more than 20% by weight.

The number-average molar weight $M_n$ (determined by gel permeation chromatography using THF as solvent and polystyrene as standard) of the polyisocyanates of the invention is generally at least 400, preferably at least 500, more preferably at least 700, and very preferably at least 1000, and is up to 5000, preferably up to 3000, more preferably up to 2000, and very preferably up to 1500.

In general the viscosity of the water-emulsifiable polyisocyanates of the invention is below 10 000 mPa*s, preferably below 9000 mPa*s, more preferably below 8000 mPa*s, very preferably below 7000 mPa*s, and more particularly between 800 and 6000 mPa*s, so that dilution with solvent is unnecessary.

The polyisocyanates (A) of the invention are frequently at least partly neutralized with at least one base (B).

The bases in question may be basic alkali metal, alkaline earth metal or ammonium salts, more particularly the sodium, potassium, cesium, magnesium, calcium and barium salts, especially sodium, potassium, and calcium salts, in the form of hydroxides, oxides, hydrogen carbonates or carbonates, preferably in the form of the hydroxides.

Preferred compounds (B), however, are ammonia or amines, preferably tertiary amines. The tertiary amines in question are preferably those which are exclusively alkyl-substituted and/or cycloalkyl-substituted.

Examples of such amines are trimethylamine, triethylamine, tri-n-butylamine, ethyldiisopropylamine, dimethylbenzylamine, dimethylphenylamine, triethanolamine, cyclopentyldimethylamine, cyclopentyldiethylamine, cyclohexyldimethylamine, and cyclohexyldiethylamine.

Conceivable, though less preferred, are also heterocyclic amines, however, such as pyridine, imidazole, N-alkylated morpholine, piperidine, piperazine or pyrrolidone.

Generally speaking, the base (B) is used to neutralize 10 to 100 mol % of the acid groups present in (A), preferably 20 to 100 mol %, more preferably 40 to 100 mol %, very preferably 50 to 100 mol %, and more particularly 70 to 100 mol %.

The at least partial neutralization of component (b) in the polyisocyanate (A) can take place before, during or after the preparation of the polyisocyanate (A), preferably after the preparation.

An advantageous composition according to the present invention comprises as compound (B) an amine of the following formula (III):

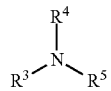

in which $R^3$, $R^4$ and $R^5$ represent a hydrocarbon chain, advantageously selected from cycloalkyl or aryl, it being possible for each of the stated radicals to be substituted by aryl, alkyl, aryloxy, alkyloxy, heteroatoms and/or heterocycles, It is also possible that the $R^3$, $R^4$ and $R^5$ groups form cyclic structures. $R^3$ and $R^4$ or $R^4$ and $R^5$ or $R^3$ and $R^5$ may thus together form a cyclic structure formed preferably of three to six carbon atoms and optionally containing at least one heteroatom preferably selected from oxygen or sulphur. N-ethyl morpholine, N-methyl morpholine and 1,2,2,6,6-pentamethylpiperidine are examples of cyclic structures of this type.

Advantageously, in the aforementioned formula (III), $R^3$, $R^4$ and $R^5$ represent, independently, a $C_1$-$C_{18}$ alkyl substituted if appropriate by aryl, alkyl, aryloxy, alkyloxy, heteroatoms and/or heterocycles or $C_6$-$C_{12}$ aryl substituted if appropriate by aryl, alkyl, aryloxy, alkyloxy, heteroatoms and/or heterocycles.

N,N-dimethylcyclohexylamine, ethyldiisopropylamine, dimethylbutylamine, dimethylbenzylamine, etc. are examples of amines which may be suitable within the scope of the invention.

The polyisocyanates (A) are generally prepared by mixing and reacting the synthesis components in any order. Preference is given to introducing the diisocyanate or polyisocyanate (a) initially, adding the synthesis components (b) and/or (c) together or in succession, and allowing reaction to take place until the reactive groups in (b) and (c) have been converted. Subsequently, if desired, the compounds (d) and/or (e) can be added.

Also conceivable is a reaction regime in which monomeric diisocyanates are reacted with one another as components (a) in the presence of the compounds (b) and/or (c). A reaction regime of this kind is described in WO 2008/116764, hereby fully incorporated by reference as part of the present disclosure content.

The reaction is carried out in general at a temperature of between 40° C. and 170° C., preferably between 45° C. and 160° C., more preferably between 50 and 150° C., and very preferably between 60 and 140° C.

The reaction can be accelerated by adding the typical catalysts (C) which catalyze the reaction of isocyanate groups with isocyanate-reactive groups. Suitable for this purpose in principle are all of the catalysts that are typically used in polyurethane chemistry.

These catalysts are, for example, organic amines, more particularly tertiary aliphatic, cycloaliphatic or aromatic amines, and/or Lewis-acidic organometallic compounds. Examples of suitable Lewis-acidic organometallic compounds include tin compounds, such as tin(II) compounds of organic carboxylic acids, for example, such as tin(II) acetate, tin(II) octoate, tin(II) ethylhexoate, and tin(II) laurate, for example, and the dialkyltin(IV) compounds of organic carboxylic acids, examples being dimethyltin diacetate, dibutyltin diacetate, dibutyltin dibutyrate, dibutyltin bis(2-ethylhexanoate), dibutyltin dilaurate, dibutyltin maleate, dioctyltin dilaurate, and dioctyltin diacetate. Also possible are metal complexes such as acetylacetonates of iron, of titanium, of aluminum, of zirconium, of manganese, of nickel, and of cobalt. Further metal catalysts are described by Blank et al. in Progress in Organic Coatings, 1999, vol. 35, pages 19-29.

Dialkyltin(IV) compounds of organic carboxylic acids are, for example, dimethyltin diacetate, dibutyltin diacetate, dibutyltin dibutyrate, dibutyltin bis(2-ethylhexanoate), dibutyltin dilaurate, dibutyltin maleate, dioctyltin dilaurate, and dioctyltin diacetate. Preference is given to dibutyltin diacetate and dibutyltin dilaurate. For toxicological reasons, tin compounds are less preferred, but are still frequently used in practice.

Other preferred Lewis-acidic organometallic compounds are zinc(II) dioctoate, zirconium acetylacetonate, and zirconium 2,2,6,6-tetramethyl-3,5-heptanedionate.

Bismuth and cobalt catalysts, cerium salts such as cerium octoates, and cesium salts can also be used as catalysts.

Bismuth catalysts are more particularly bismuth carboxylates, especially bismuth octoates, ethylhexanoates, neodecanoates or pivalates; examples are K-KAT 348 and XK-601 from King Industries, TIB KAT 716, 716LA, 716XLA, 718, 720, 789 from TIB Chemicals, and those from Shepherd Lausanne, and also catalyst mixtures of, for example, bismuth organyls and zinc organyls.

Preferred Lewis-acidic organometallic compounds are dimethyltin diacetate, dibutyltin dibutyrate, dibutyltin bis(2-ethylhexanoate), dibutyltin dilaurate, dioctyltin dilaurate, zirconium acetylacetonate, and zirconium 2,2,6,6-tetramethyl-3,5-heptanedionate.

Additionally, bismuth catalysts and cobalt catalysts, and cesium salts too, can be used as catalysts. Suitable cesium salts are those compounds in which the following anions are used: $F^-$, $Cl^-$, $ClO^-$, $ClO_3^-$, $ClO_4^-$, $Br^-$, $I^-$, $IO_3^-$, $CN^-$, $OCN^-$, $NO_2^-$, $NO_3^-$, $HCO_3^-$, $CO_3^{2-}$, $S^{2-}$, $SH^-$, $HSO_3^-$, $SO_3^{2-}$, $HSO_4^-$, $SO_4^{2-}$, $S_2O_2^{2-}$, $S_2O_4^{2-}$, $S_2O_5^{2-}$, $S_2O_6^{2-}$, $S_2O_7^{2-}$, $S_2O_8^{2-}$, $H_2PO_2^-$, $H_2PO_4^-$, $H_2PO_4^{2-}$, $PO_4^{3-}$, $P_2O_7^{4-}$, $(OC_nH_{2n+1})^-$, $(C_nH_{2n-1}O_2)^-$, $(C_nH_{2n-3}O_2)^-$, and $(C_{n+1}H_{2n-2}O_4)^{2-}$, where n stands for the numbers 1 to 20.

Preferred in this context are cesium and bismuth carboxylates in which the anion conforms to the formulae $(C_nH_{2n-1}O_2)^-$ and also $(C_{n+1}H_{2n-2}O_4)^{2-}$ with n being 1 to 20. Particularly preferred cesium salts contain monocarboxylate anions of the general formula $(C_nH_{2n-1}O_2)^-$, where n stands for the numbers 1 to 20. Particularly deserving of mention in this context are formate, acetate, propionate, hexanoate, and 2-ethylhexanoate.

The reaction mixtures comprising polyisocyanates (A) thus obtained are generally used further as they are.

The reaction can be carried out optionally in an inert solvent or solvent mixture (E). After the reaction this solvent or solvent mixture is preferably not removed, but instead the polyisocyanate with solvent is used directly.

Preference is given to polar, nonprotic solvents such as esters, ethers, glycol ethers and glycol esters, preferably propylene glycol ethers and esters, more preferably ethylene glycol ethers and esters, and also carbonates.

Esters are, for example, n-butyl acetate, ethyl acetate, 1-methoxyprop-2-yl acetate, and 2-methoxyethyl acetate, gamma-butyrolactone, and also the monoacetyl and diacetyl esters of ethylene glycol, diethylene glycol, triethylene glycol, propylene glycol, dipropylene glycol or tripropylene glycol, examples being butylglycol acetate and butyldiglycol acetate.

Additionally conceivable are poly($C_2$ to $C_3$)alkylene glycol ($C_1$ to $C_4$)monoalkyl ether acetates such as, for example, acetic esters of mono- or dipropylene glycol monomethyl ether.

Further examples are carbonates, preferably 1,2-ethylene carbonate, more preferably 1,2-propylene carbonate or 1,3-propylene carbonate.

Ethers are, for example, tetrahydrofuran (THF), dioxane, and the dimethyl, diethyl or di-n-butyl ethers of ethylene glycol, diethylene glycol, triethylene glycol, propylene glycol, dipropylene glycol or tripropylene glycol, preferably dipropylene glycol dimethyl ether, which is available as an isomer mixture under the trade name Proglyde® DMM from Dow Chemical Company, for example.

Particular preference is given to n-butyl acetate, 1-methoxyprop-2-yl acetate, 2-methoxyethyl acetate, N-methylpyrrolidone, gamma-butyrolactone, propylene carbonate (Solvenon® PC; 4-methyl-1,3-dioxolan-2-one), Butoxyl (3-methoxy-n-butyl acetate), butylglycol acetate, butyldiglycol acetate, dipropylene glycol dimethyl ether, propylene glycol diacetate, ethyl-3-ethoxypropionate, and also dicarboxylic esters and mixtures thereof, and also mixtures of the stated solvents.

Very particular preference is given to n-butyl acetate, 1,2-propylene carbonate, butylglycol acetate, butyldiglycol acetate, dipropylene glycol dimethyl ether, and 3-methoxy-n-butyl acetate.

A solvent (E) can also be added to the reaction mixture after the end of the reaction and prior to dispersion in the binder.

The mixture may further be admixed optionally with a further diisocyanate or, preferably, polyisocyanate (F), which can in principle be the same diisocyanates or polyisocyanates as set out above under (a), but which may also be different than said component (a).

Based on isocyanate groups, component (F) can be used in an amount from 0 to twenty times the amount of the polyisocyanate (A), preferably from 0 to ten times the amount.

In one embodiment of the present invention the polyisocyanates (A) can be used for the preparation of one-component coating materials as polyurethane dispersions for coatings or adhesives.

For the preparation of a one-component coating composition, at least one polyisocyanate (A) and, if appropriate, further, typical coatings constituents are mixed, and the final composition is applied to the substrate.

The present invention further provides for the preparation of two-component polyurethane coating materials or aqueous dispersion-based adhesives. For this preparation the polyisocyanates (A) are mixed with an aqueous polyol component (D), preferably by being introduced into it. This is generally done with gentle to vigorous stirring, in order to disperse the polyisocyanates. It is an advantage of the polyisocyanates of the invention that they are readily dispersible in such aqueous solutions or dispersions of polyols as binders.

The dispersible polyisocyanates (A) of the invention may optionally further be blended with additional polyisocyanates that have not been modified for dispersibility, examples being those polyisocyanates as listed under (a), and, after blending, can be reacted with the binders. In this case care should be taken to note that the polyisocyanates (A) of the invention must be equipped with the actively dispersing components (b) and (c) in such a way that they are sufficiently dispersible in order to disperse the polyisocyanates in their entirety (polyisocyanate (A) and polyisocyanates which have not been modified for dispersibility).

The preparation of coating compositions from the water-emulsifiable polyisocyanates containing isocyanurate groups and prepared in accordance with the invention is accomplished by reaction with aqueous solutions, emulsions or dispersions of polyols: polyacrylate-ol, polyester-ol, polyurethane-ol, polyether-ol, and polycarbonate-ol dispersions, and also their hybrids and/or mixtures of the stated polyols. Hybrids means graft copolymers and other chemical reaction products which include chemically attached molecular moieties having different (or else like) groups from among those stated. Preference is given to polyacrylate-polyol dispersions, polyester-polyol dispersions, polyether-polyol dispersions, polyurethane-polyol dispersions, polycarbonate-polyol dispersions, and their hybrids.

Polyacrylate-ols can be prepared as primary or secondary dispersions, emulsions, and solutions. They are prepared from olefinically unsaturated monomers. These are, firstly, comonomers containing acid groups, having for example carboxylic, sulfonic acid and/or phosphonic acid groups or their salts, such as (meth)acrylic acid, vinylsulfonic acid or vinylphosphonic acid, for example. These are, secondly, comonomers containing hydroxyl groups, such as hydroxyalkyl esters or amides of (meth)acrylic acid, such as 2-hydroxyethyl and 2 or 3-hydroxypropyl (meth)acrylate, for example. These are, thirdly, unsaturated comonomers which contain neither acidic groups nor hydroxyl groups, such as alkyl esters of (meth)acrylic acid, styrene and derivatives, (meth)acrylonitrile, vinyl esters, vinyl halides, vinyl imidazole, etc. The properties can be influenced, for example, via the composition of the polymer, and/or, for example, via the glass transition temperatures of the comonomers (with different hardness).

Polyacrylate-ols for aqueous applications are described for example in EP 358979 (U.S. Pat. No. 5,075,370), EP 557844 (U.S. Pat. No. 6,376,602), EP 1141066 (U.S. Pat. No. 6,528,573) or 496210 (U.S. Pat. No. 5,304,400).

One example of a commercially available secondary polyacrylate emulsion is Bayhydrol® A 145 (a product of Bayer MaterialScience). Examples of a primary polyacrylate emulsion are Bayhydrol® VP LS 2318 (a product of Bayer MaterialScience) and Luhydran® products from BASF AG.

Other examples are Macrynal® VSM 6299w/42WA from Cytec, and Setalux® AQ products from Nuplex Resins, such as Setalux® 6510 AQ-42, Setalux® 6511 AQ-47, Setalux® 6520 AQ-45, Setalux® 6801 AQ-24, Setalux® 6802 AQ-24, and Joncryl® from BASF Resins.

Polyacrylate-ols may also have a heterogeneous structure, as is the case for core-shell structures.

Polyester-ols for aqueous applications are described for example in EP 537568 (U.S. Pat. No. 5,344,873), EP 610450 (U.S. Pat. No. 6,319,981, polycondensation resin), and EP 751197 (U.S. Pat. No. 5,741,849, polyester-polyurethane mixture). Polyester-ols for aqueous applications are, for example, WorléePol products from Worlée-Chemie GmbH, Necowel® products from Ashland-Südchemie-Kernfest GmbH, and Setalux® 6306 SS-60 from Nuplex Resins.

Polyurethane-polyol dispersions for aqueous applications are described for example in EP 469389 (U.S. Pat. No. 559,805). They are marketed, for example, under the brand name Daotan® from DSM NV.

Polyether-ols for aqueous applications are described for example in EP 758007.

Hybrids and mixtures of the various polyols are described for example in EP 424705 (U.S. Pat. No. 417,998), EP 496205 (U.S. Pat. No. 5,387,642), EP 542085 (5308912, polyacrylate/polyether mixture), EP 542105 (U.S. Pat. No. 5,331,039), EP 543228 (U.S. Pat. No. 5,336,711, polyester/polyacrylate hybrids), EP 578940 (U.S. Pat. No. 5,349,041, polyester/urethane/carbonate), EP 758007 (U.S. Pat. No. 5,750,613, polyacrylate-polyether mixture), EP 751197 (U.S. Pat. No. 5,741,849), EP 1141065 (U.S. Pat. No. 6,590,028).

Polyesters/polyacrylates are described for example in EP 678536 (U.S. Pat. No. 5,654,391). One example of a secondary polyester/polyacrylate emulsion is Bayhydrol® VP LS 2139/2 (a product of Bayer MaterialScience).

To incorporate the water-emulsifiable polyisocyanates of the invention it is generally enough to distribute the inventively obtained polyisocyanate in the aqueous dispersion of the polyol. Generating the emulsion generally requires an energy input of 0 to not more than $10^8$ W/m$^3$.

The dispersions generally have a solids content of 10% to 85%, preferably of 20% to 70% by weight and a viscosity of 10 to 500 mPa*s.

For the preparation of a coating composition, polyisocyanate (A) and also, optionally, (F) and binders are mixed with one another in a molar ratio of isocyanate groups to isocyanate-reactive groups of 0.1:1 to 10:1, preferably 0.2:1 to 5:1, more preferably 0.3:1 to 3:1, and very preferably 0.5:1 to 2.5:1, it also being possible, if appropriate, for further, typical coatings constituents to be mixed in, and the final composition is applied to the substrate.

In one embodiment of the invention, when using a primary (polyacrylate) dispersion, the ratio of NCO to NCO-reactive groups is from 1:8 to 2:1, preferably from 1:2 to 1:3, and more preferably about 1:2.5.

In another embodiment of the invention, when using a secondary (polyacrylate) dispersion, the ratio of NCO to NCO-reactive groups is from 1.3:1 to 2:1, more particularly from 1.4:1 to 1.8:1.

Curing typically takes place until the cured materials can be handled further. The properties associated with this are, for example, dust drying, through-drying, blocking resistance or packability.

In one preferred embodiment the curing takes place at room temperature within not more than 12 hours, preferably up to 8 hours, more preferably up to 6 hours, very preferably up to 4 hours, and more particularly up to 3 hours.

In another preferred version the curing takes place, for example, for half an hour at temperatures up to 80° C. After cooling, a room-temperature postcure may be necessary in addition.

The coating of the substrates takes place in accordance with typical methods known to the skilled worker, which involve applying at least one coating composition in the desired thickness to the substrate that is to be coated, and removing any volatile constituents that may be present in the coating composition, if appropriate with heating. This operation can if desired be repeated one or more times. Application to the substrate may take place in a known way, as for example by spraying, troweling, knifecoating, brushing, rolling, roller coating, pouring, laminating, injection backmolding or coextruding.

The thickness of a film of this kind to be cured can be from 0.1 μm up to several mm, preferably from 1 to 2000 μm, more preferably 5 to 200 μm, very preferably from 10 to 60 μm (based on the coating material in the state in which the solvent has been removed from the coating material).

Also provided by the present invention are substrates coated with a multicoat paint system of the invention.

Polyurethane coating materials of this kind are especially suitable for applications requiring a particularly high level of application reliability, external weathering resistance, optical qualities, solvent resistance, chemical resistance, and water resistance.

The resulting coating compositions and coating formulations are suitable for coating substrates such as wood, wood veneer, paper, paperboard, cardboard, textile, film, leather, nonwoven, plastics surfaces, glass, ceramic, mineral building materials, such as cement moldings, fiber-cement slabs or metals, each of which may optionally have been precoated and/or pretreated, more particularly for plastics surfaces.

Coating compositions of this kind are suitable as or in interior or exterior coatings, i.e., applications of this kind involving exposure to daylight, preferably of parts of buildings, coatings on (large) vehicles and aircraft, and industrial applications, decorative coatings, bridges, buildings, power masts, tanks, containers, pipelines, power stations, chemical plants, ships, cranes, posts, sheet piling, valves, pipes, fittings, flanges, couplings, halls, roofs, and structural steel, furniture, windows, doors, woodblock flooring, can coating and coil coating, for floor coverings, as in the case of parking levels, or in hospitals, and in automobile finishes as OEM and refinish application.

Coating compositions of this kind are preferably used at temperatures between ambient temperature to 80° C., preferably to 60° C., more preferably to 40° C. The articles in question here are preferably those which cannot be cured at high temperatures, such as large machines, aircraft, large-volume vehicles, and refinish applications.

The coating compositions of the invention are employed more particularly as clearcoat, basecoat, and topcoat materials, primers, and surfacers.

Polyisocyanate compositions of this kind can be used as curing agents for producing coating materials, adhesives, and sealants.

Likewise provided by the present invention, accordingly, are coating materials, adhesives, and sealants comprising at least one polyisocyanate composition of the invention, and also substrates which are coated, bonded or sealed using them.

Figures in ppm or percent that are used in this specification relate, unless otherwise indicated, to weight percentages and ppm by weight.

The examples which follow are intended to illustrate the invention but not to confine it to these examples.

EXAMPLES

Polyisocyanate A

Polyisocyanate prepared by trimerizing some of the isocyanate groups of 1,6-diisocyanatohexane (HDI) and containing isocyanurate groups, said polyisocyanate being composed substantially of tris(6-isocyanatohexyl) isocyanurate and its higher homologs, with an NCO content of 22.2% and a viscosity at 23° C. of 2800 mPa*s (commercially available as BASONAT® HI100 at BASF SE, Ludwigshafen, Germany)

Hydrophilic Compound B1

Monofunctional polyethylene oxide prepared starting from methanol and with potassium hydroxide catalysis, with an average OH number of 112 mg KOH/g, measured to DIN 53 240, corresponding to a molecular weight of 500 g/mol. The residues of catalyst still present were subsequently neutralized with acetic acid and the product was desalinated. In the course of this procedure, potassium acetate formed was also removed.

Hydrophilic Compound B2

Mixture of 250 g 2-ethylhexyl phosphate (45 mol % mono ester and 55 mol % di ester) and 177 g dimethyl cyclohexyl amine.

Example 1

250 g Polyisocyanate A, 5 g hydrophilic compound B1 and 20 g hydrophilic compound B2 were reacted at 90° C. for 3 hours. The product obtained had an NCO content of 18.9% and a viscosity of 3650 mPas at 23° C.

Comparative Example 1

180 g Polyisocyanate A and 20 g hydrophilic compound B1 were reacted at 90° C. for 3 hours. The product obtained had an NCO content of 18.8% and a viscosity of 2500 mPas at 23° C.

Comparative Example 2

250 g Polyisocyanate A and 32.7 g hydrophilic compound B2 were reacted at 90° C. for 3 hours. The product obtained had an NCO content of 18.7% and a viscosity of 4280 mPas at 23° C.

Comparative Example 3

250 g Polyisocyanate A and 20 g hydrophilic compound B2 were reacted at 90° C. for 3 hours. The product obtained had an NCO content of 19.4% and a viscosity of 3600 mPas at 23° C.

Comparative Example 4

250 g Polyisocyanate A and 5 g hydrophilic compound B2 were reacted at 90° C. for 3 hours. The product obtained had an NCO content of 20.9% and a viscosity of 2550 mPas at 23° C.

Coating Formulation and Properties

Formulation 100 g Luhydran® S938T (acrylate-based waterborne polyol commercially available from BASF SE, OH-number 100 mg KOH/g, 45% in water) were admixed with 2.5 g butyldiglycolacetate and 6.7 g butylgylcolacetate as film forming agent. The pH of the mixture was adjusted to 8.5 by using 0.9 g of a 50 wt % solution of dimethyl ethanolamine in water. The application viscosity was adjusted using 7.8 g water and 0.52 g BYK® 340 (Fa. BYK) defoamer were added.

The polyisocyanates from the above examples were diluted to a solids content of 80% with dipropylene glycol dimethyl ether.

5 g of the thus obtained solution were added to 45 g of the above-mentioned polyol, the mixture was stirred by hand, using a wooden spatula for 20 seconds at 140 to 180 rpm. Thereafter the films were applied to card board with a film-drawing frame (box-type coating bar) in a wet film thickness of 150 μm.

The gloss was measured at the stated angle (20°, 60° and 90°) after drying at 30 minutes at 60° C. using a micro-TRI-gloss μ apparatus of BYK.

The average diameter (z-average) of the particles was measured at 25° C. by means of dynamic light scattering using the Malvern® Zetasizer 1000.

| Example | Emulsifier B1 (wt %) | Emulsifier B2 (wt %) | Viscosity (mPa·s) | NCO Content (wt %) | Particle Size (nm) | Gloss 20° | Gloss 60° | Gloss 90° |
|---|---|---|---|---|---|---|---|---|
| Example 1 | 2 | 8 | 3650 | 18.9 | 138 | 23 | 62 | 93 |
| CompEx 1 | 10 | 0 | 2500 | 18.8 | 580 | 6 | 29 | 43 |
| CompEx 2 | 0 | 13 | 4280 | 18.7 | 260 | 7 | 36 | 78 |
| CompEx 3 | 0 | 8 | 3600 | 19.4 | 3800 | 1 | 11 | 43 |
| CompEx 4 * | 2 | 0 | 2550 | 20.9 | — | — | — | — |

* not dispersible in water

Comparative Examples 1 and 2 were adjusted to comparable NCO contents as Example 1. The emulsifiability and gloss retention were lower than in the example according to the invention.

Comparative Examples 3 and 4 used the same amounts of the single emulsifiers as in Example 1. Emulsifiability, viscosity, and gloss were worse than in the example according to the invention.

The invention claimed is:

1. A water-dispersible polyisocyanate (A), comprising as synthesis components in the following wt % based on isocyanate groups in synthesis component (a):
   (a) at least one diisocyanate or polyisocyanate; and
   (b) 0.5 to 30 wt % of a mixture of compounds of formulae (I) and (II):

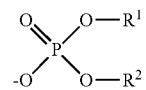

-continued

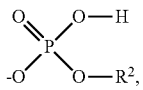

wherein:
R¹ and R² independently of one another represent alkyl, cycloalkyl or aryl, optionally substituted by aryl, alkyl, aryloxy, alkyloxy, heteroatoms and/or heterocycles;
a molar ratio of the compound (II) to the compound (I) ranges from 5:95 to 95:5;
(c) 0.3 to 25 wt %, based on isocyanate-reactive groups in (c), of at least one monofunctional polyalkylene glycol of formula

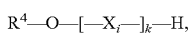

wherein:
R⁴ represents $C_1$-$C_{20}$ alkyl, $C_2$-$C_{20}$ alkyl uninterrupted or interrupted by one or more of an oxygen atom and a sulfur atom, or is $C_6$-$C_{12}$ aryl, $C_5$-$C_{12}$ cycloalkyl or a five- or six-membered heterocycle comprising at least one of an oxygen, nitrogen and sulfur atom, it being possible for each of stated radicals to be substituted by functional groups, aryl, alkyl, aryloxy, alkyloxy, halogen, heteroatoms and/or heterocycles;
k represents an integer from 5 to 40; and
each $X_i$ for i=1 to k is independently selected from the group consisting of —$CH_2$—$CH_2$—O—, —$CH_2$—CH($CH_3$)—O—, —CH($CH_3$)—$CH_2$—O—, —$CH_2$—C($CH_3$)$_2$—O—, —C($CH_3$)$_2$—$CH_2$—O—, —$CH_2$—CHVin-O—, —CHVin-$CH_2$—O—, —$CH_2$—CHPh-O—, and —CHPh-$CH_2$—O—, in which Ph is phenyl and Vin is vinyl;
(d) 0 to 15 wt %, based on isocyanate-reactive groups in (d), of at least one high molecular mass diol or polyol; and
(e) 0 to 15 wt %, based on isocyanate-reactive groups in (e), of at least one low molecular mass diol or polyol.

2. The water-dispersible polyisocyanate (A) according to claim 1, wherein component (a) is a polyisocyanate synthesized from at least one (cyclo)aliphatic isocyanate.

3. The water-dispersible polyisocyanate (A) according to claim 1, wherein component (a) is a polyisocyanate comprising at least one of an allophanate group and an isocyanurate group and is based on isophorone diisocyanate, 1,6-hexamethylene diisocyanate or both.

4. The water-dispersible polyisocyanate (A) according to claim 1, wherein the compound (b) is selected from the group consisting of mono methyl phosphate, di methyl phosphate, mono ethyl phosphate, di ethyl phosphate, mono n-butyl phosphate, di n-butyl phosphate, mono 2-ethylhexyl phosphate, di 2-ethylhexyl phosphate, and mixtures thereof.

5. The water-dispersible polyisocyanate (A) according to claim 1, having the following construction, based on isocyanate groups in synthesis component (a):
(b) 0.8 to 25 wt % of compounds of formula (I) and/or (II),
(c) 0.5 to 20 wt %, based on isocyanate-reactive groups in (c),
(d) 0 to 10 wt %, based on isocyanate-reactive groups in (d), and
(e) 0 to 10 wt %, based on isocyanate-reactive groups in (e).

6. The water-dispersible polyisocyanate (A) according to claim 1, wherein phosphate groups in compound (b) have been at least partly neutralized.

7. The water-dispersible polyisocyanate (A) according to claim 1, wherein phosphate groups in compound (b) have been at least partly neutralized with tertiary amines.

8. The water-dispersible polyisocyanate (A) according to claim 1, wherein, in component (b), R¹ and R² independently of one another represent unsubstituted alkyl or unsubstituted aryl.

9. The water-dispersible polyisocyanate (A) according to claim 8, wherein R¹ and R² independently of one another are selected from the group consisting of phenyl, methyl, ethyl, n-butyl, and 2-ethylhexyl.

10. An aqueous coating composition, comprising at least one water-dispersible polyisocyanate (A) according to claim 1 and optionally at least one binder selected from the group consisting of polyacrylate-polyol dispersions, polyester-polyol dispersions, polyether-polyol dispersions, polyurethane-polyol dispersions, polycarbonate-polyol dispersions, and their hybrids.

11. A process, comprising coating an article with a coating composition comprising at least one water-dispersible polyisocyanate (A) according to claim 1, wherein the article is selected from the group consisting of a wood, a wood veneer, a paper, a paperboard, a cardboard, a textile, a film, a leather, a nonwoven, a plastic surface, a glass, a ceramic, a mineral building material, a cement molding, a fiber-cement slab, and a fiber-cement metal, each of which may optionally have been precoated or pretreated.

12. A process, comprising coating an article with a coating composition comprising at least one water-dispersible polyisocyanate (A) according to claim 1, wherein the article is selected from the group consisting of buildings, (large) vehicles, aircraft, industrial applications, decorative coatings, bridges, buildings, power masts, tanks, containers, pipelines, power stations, chemical plants, ships, cranes, posts, sheet piling, valves, pipes, fittings, flanges, couplings, halls, roofs, structural steel, furniture, windows, doors, woodblock flooring, can coating and coil coating, for floor coverings, parking levels, in hospitals, and in automobile finishes as OEM and refinish application.

13. A coating material, adhesive or sealant comprising at least one polyisocyanate according to claim 1.

14. A substrate coated, bonded or sealed with a coating material, adhesive or sealant according to claim 13.

* * * * *